United States Patent Office 2,846,445
Patented Aug. 5, 1958

2,846,445

SYNTHESIS OF STEROIDS

Harold Raffelson, St. Louis, Mo., assignor to Monsanto Chemical Company, St. Louis, Mo., a corporation of Delaware No Drawing. Application June 14, 1954
Serial No. 436,719

11 Claims. (Cl. 260—340.5)

This invention relates to the cyclic acetals of the alkyl ester of 1-($\beta$-carboxyethyl)-2-keto-6,7-dihydroxy-14-methyl-$\Delta^{11(1)}$-dodecahydrophenanthrene and to processes for making same which compounds are useful in the synthesis of steroids, particularly a member of the cyclopentanodimethylpolyhydrophenanthrene series, namely a 17-formyl-cyclopentano-10,13-dimethyl-$\Delta^{4,9(11)}$-decahydrophenanthren-3-one

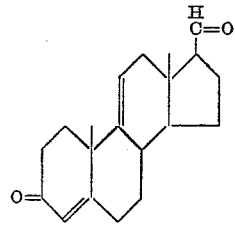

The sequence of steps or series of reactions proceeding to the 17-formyl-cyclopentano-$\Delta^{4,9(11)}$-decahydrophenanthren-3-one for purposes of this invention is outlined schematically in the following diagram.

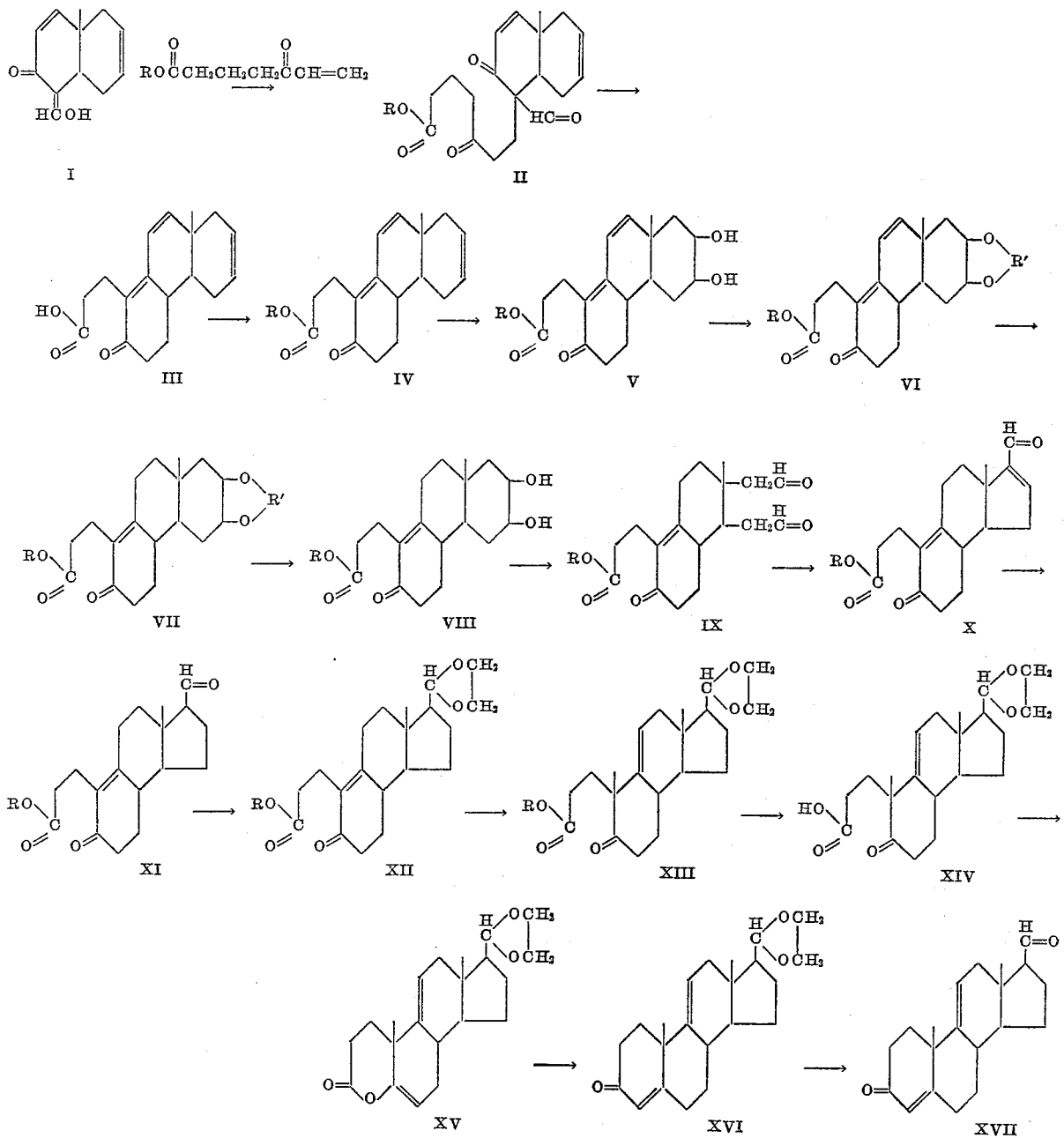

The initial reactant of the process outlined in the foregoing diagram, namely 1-(hydroxy) methylene-2-keto-10-methyl-1,2,5,8,9,10-hexahydronaphthalene

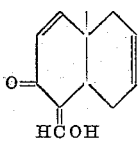

as will be obvious to those skilled in the art contains two asymmetric carbon atoms. As a result thereof such exists in the form of four optically active isomers or two racemates, i. e. cis and trans racemic mixtures of the dextro and levo optically active isomers. All such forms per se or in any combination thereof may be employed in the process outlined herein. The initial reactant (Compound I) is prepared by the formylation of the corresponding 2-keto-10-methyl-1,2,5,8,9,10-hexahydronaphthalene

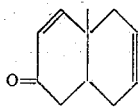

employing ethyl formate in the presence of sodium methylate. As illustrative of such is the following.

*Example A*

To a suitable reaction vessel is charged 17.3 parts by weight (substantially 0.32 mol) of solid sodium methylate, 75 parts by weight of anhydrous benzene and 37 parts by weight (substantially 0.5 mol) of ethyl formate while maintaining the temperature at about 20–25° C. The suspension so obtained is then agitated for about 20–30 minutes employing a nitrogen atmosphere and then cooled to about 10° C. Thereupon approximately 16.1 parts by weight (substantially 0.1 mol) of the levo-rotatory form of trans-2-keto-10-methyl-1,2,5,8,9,10-hexahydronaphthalene dissolved in 150 parts by weight of benzene is added and the mixture agitated for about 3 hours at about 15° C. The reaction mass so obtained is then quenched with cold dilute sulfuric acid (20 parts by weight sulfuric acid in 125 parts by weight of water) while maintaining the temperature at about 15° C. and agitating for about 5 minutes. The aqueous layer is separated and extracted with several small portions of benzene. The benzene extracts are combined with the original organic layer and the combined mix subjected to vacuum distillation. The light tan oily residue so obtained consists essentially (95% by weight) of the 1-(hydroxy) methylene derivative of the levo-rotatory form of trans-2-keto-10-methyl-1,2,5,8,9,10-hexahydronaphthalene. The oil is admixed with 105 parts by weight of methanol and with agitation heated to about 50° C. While constantly agitating 400 parts by weight of an aqueous 5% copper acetate solution is slowly added. The precipitate, namely the copper chelate of the 1-(hydroxy) methylene derivative of the levo-rotatory form of trans-2-keto-10-methyl-1,2,5,8,9,10-hexahydronaphthalene, is filtered off, washed with methanol, and then slurried with 87 parts by weight of benzene. To the slurry so obtained is added 1800 parts by weight of 26% sulfuric acid. The organic layer is recovered, washed with aqueous sodium bicarbonate followed by a water wash, and the solvent removed in vacuum. The residue is the oily levo-rotatory isomer of trans-1-(hydroxy) methylene-2-keto-10-methyl-1,2,5,8,9,10-hexahydronaphthalene, B. P. 122–123° C. at 2–3 mm., $n_D^{25}=1.5570$, $[\alpha]_D^{25}=-151.6$ (C=2, CHCl$_3$).

In a similar fashion *dl*-trans-1-(hydroxy) methylene-2-keto-10-methyl-1,2,5,8,9,10-hexahydronaphthalene is obtained from *dl*-trans-2-keto-10-methyl-1,2,5,8,9,10-hexahydronaphthalene. Also, similarly, *dl*-cis-1-(hydroxy) methylene - 2 - keto - 10 - methyl - 1,2,5,8,9,10 - hexahydronaphthalene is obtained from *dl*-cis-2-keto-10-methyl-1,2,5,8,9,10-hexahydronaphthalene.

In the first step of the process of the foregoing diagram 1-(hydroxy) methylene-2-keto-10-methyl-1,2,5,8,9,10-hexahydronaphthalene is reacted with a 5-keto-6-heptanoic acid ester of the formula

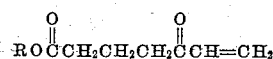

where R is a short chain alkyl radical such as methyl, ethyl, propyl, butyl, etc., in an anhydrous medium in the presence of a quaternary ammonium alkoxide and an inert solvent such as dioxane, isopropanol, butanol, isobutanol, tert. butanol, pentasol, etc. In general temperatures in the range of 0 to 60° C. can be employed, however, it is preferred that the reaction temperature be about 10 to 30° C. As illustrative of the preparation of the 1-heptanoic acid ester adduct (Compound II) is the following:

*Example I*

To a suitable reaction vessel is added and intimately mixed 14.1 parts by weight of the levo-rotatory isomer of trans-1-(hydroxy) methylene-2-keto-10-methyl-1,2,5,8,9,10-hexahydronaphthalene, 14.9 parts by weight of 5-keto-6-heptanoic acid methyl ester, and 15.6 parts by weight of tert. butanol and the mix cooled to 10–15° C. Thereupon approximately 2.4 parts by weight of a 29.8% by weight n-butanol solution of benzyltrimethylammonium n-butoxide admixed with approximately 4 parts by weight of tert. butanol is added to the agitated mixture over a period of about 15 minutes. The mix is then held at 20–25° C. for about 16 hours, seeded with a minute amount of the final product and then held at 20–35° C. for about 48 hours. To the resultant mass is added with agitation approximately 25 parts by weight of petroleum ether and the mix cooled to about 0° C. The precipitate is filtered off, washed with petroleum ether, then with water and dried. The white crystalline product so obtained is the levo-rotatory isomer of trans-1-formyl-1-(3 - keto - 6 - carbomethoxy - hexyl) - 2 - keto - 10-methyl-1,2,5,8,9,10-hexahydronaphthalene

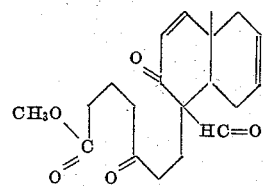

M. P. 66–67° C., $[\alpha]_D^{25}=-206$ (C=2, CHCl$_3$)

In like manner *dl*-trans-1-formyl-1-(3-keto-6-carbomethoxy - hexyl) - 2 - keto - 10 - methyl - 1,2,5,8,9,10-hexahydronaphthalene is obtained from *dl*-trans-1-(hydroxy) methylene-2-keto-10-methyl-1,2,5,8,9,10-hexahydronaphthalene.

In the process described in Example I other quaternary ammonium alkoxides may be employed although benzyltrimethyl ammonium n-butoxide is preferred, e. g. those of the formula

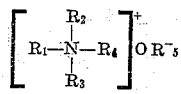

where $R_1$, $R_2$, $R_3$ and $R_4$ are alkyl or aralkyl radicals and where $R_5$ is an alkyl radical. Examples of alkyl comprise methyl, ethyl, propyl, butyl, amyl, octyl and the like. Examples of aralkyl comprise benzyl, phenethyl, and the like. The quaternary ammonium alkoxides particularly preferred are those wherein $R_1$, $R_2$ and $R_3$ are straight chain alkyl radicals containing 1–4 carbon atoms, where $R_4$ is benzyl and where $R_5$ is a branched or straight chain alkyl radical containing 2 to 6 carbon atoms.

In the second step of the process described herein the heptanoic acid adduct (Compound II) is treated with an alkali metal hydroxide such as sodium or potassium hydroxide and ring closes to form a 1-(β-carboxyethyl)-2-keto-14-methyl-Δ⁶,⁹,¹¹⁽¹⁾-octahydrophenanthrene of the formula

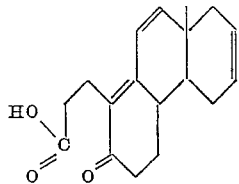

As illustrative of the preparation of such keto-acid is the following

Example II

To a suitable reaction vessel is added and intimately mixed approximately 19 parts by weight of 85% potassium hydroxide, approximately 100 parts by weight of water, and approximately 10 parts by weight of the levo-rotatory isomer of trans-1-formyl-1-(3-keto-6-carbomethoxy - hexyl) - 2 - keto - 10 - methyl - 1,2,5,8,9,10 - hexahydronaphthalene. This mix so obtained is heated to about 70° C. and held at this temperature for about two hours. The aqueous solution is cooled and admixed with an equal volume of diethyl ether. The ether layer is discarded. The aqueous layer is then acidified with hydrochloric acid and extracted with several portions of diethyl ether. The extracts are combined, washed with water, dried and subjected to vacuum distillation. The solid residue is triturated with 75 parts by weight of a mixture of diethyl ether and petroleum ether, filtered and dried. The crystalline product so obtained is the levo-rotatory isomer of anti-trans-1-(β-carboxyethyl)-2-keto - 14 - methyl - Δ⁶,⁹,¹¹⁽¹⁾ - octahydrophenanthrene, M. P. 101–102° C., $[\alpha]_D^{25}=-374$ (C=2, CHCl₃).

In a similar fashion dl-anti-trans-1-(β-carboxyethyl)-2 - keto - 14 - methyl - Δ⁶,⁹,¹¹⁽¹⁾ - octahydrophenanthrene is obtained from dl-trans-1-formyl-(3-keto-6-carbomethoxy - hexyl) - 2 - keto - 10 - methyl - 1,2,5,8,9,10-hexahydronaphthalene.

In the third step of the process described herein the carboxy group of Compound III is esterified in an acid medium with an anhydrous short chain alcohol such as methanol, ethanol, isopropanol, butanol, and the like to provide an ester (Compound IV) of the structure

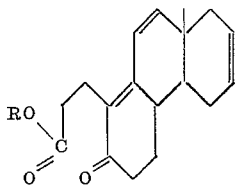

where R is a short chain alkyl radical. As illustrative of this step is the following

Example III

To a suitable reaction vessel is added and intimately mixed 100 parts by weight of the levo-rotatory isomer of anti - trans - 1 - (β - carboxyethyl) - 2 - keto - 14 - methyl-Δ⁶,⁹,¹¹⁽¹⁾-octahydrophenanthrene, 350 parts by weight of methyl alcohol and 17.5 parts by weight of anhydrous hydrochloric acid. The mixture is heated at 65° C. for about 4 hours. The solvent is removed under vacuum and the residue is taken up with diethyl ether, washed with aqueous sodium carbonate, then with water and dried. Upon removal of the solvent by vacuum distillation a light yellow oily product identified as the methyl ester of the levo-rotatory isomer of anti-trans-1-(β-carboxyethyl)-2-keto - 14 - methyl - Δ⁶,⁹,¹¹⁽¹⁾ - octahydrophenanthrene is obtained.

Similarly the methyl ester of dl-anti-trans-1-(β-carboxyethyl) - 2 - keto - 14 - methyl - Δ⁶,⁹,¹¹⁽¹⁾ - octahydrophenanthrene is obtained from dl-anti-trans-1-(β-carboxyethyl) - 2 - keto - 14 - methyl - Δ⁶,⁹,¹¹⁽¹⁾ - octahydrophenanthrene and anhydrous methyl alcohol in an acid medium. Other acidic esterification catalysts than hydrochloric acid may be employed, for example sulfuric acid.

In the fourth step of the process outlined herein the keto-acid ester (Compound IV) is converted to the 6,7-cis-glycol (Compound V)

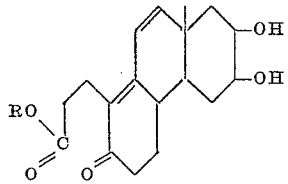

by treatment of the former with the silver salt of a low molecular weight fatty acid such as acetic acid and bromine or preferably iodine in the presence of a low molecular weight fatty acid such as acetic acid and then hydrolyzing the half esters so produced. As illustrative of this step is the following

Example IV 21.6 parts by weight of the methyl ester of the levo-rotatory isomer of anti-trans-1-(β-carboxyethyl)-2-keto-14-methyl-Δ⁶,⁹,¹¹⁽¹⁾-octahydrophenanthrene is dissolved in 794 parts by weight of glacial acetic acid and thereto is added and intimately mixed 26.0 parts by weight of silver acetate and 18.5 parts by weight of iodine. To the mix is added 2.5 parts by weight of water and the mix agitated for about 1 hour at 25° C. The mixture is heated to 90–100° C. and maintained at that temperature for about 3 hours. The reaction mixture is cooled and filtered and the filtrate subjected to vacuum distillation to remove the bulk of the acetic acid solvent. The residue is then taken up with 400 parts by weight of methyl alcohol and neutralized with potassium hydroxide. To the solution so neutralized is added 209 parts by weight of a 4.5% by weight methanol solution of potassium hydroxide and the mixture allowed to stand for about 16 hours at 25° C. under an atmosphere of nitrogen. The solution is then neutralized with 37% hydrochloric acid and subjected to vacuum distillation. The residue is then taken up with chloroform and washed with three portions of a saturated sodium chloride solution. The chloroform solution is dried over magnesium sulfate and filtered. The filtrate is subjected to vacuum distillation. The oily residue contains a small amount of the levo-rotatory isomer of anti-trans - 1 - (β - carboxyethyl) - 2 - keto - 6,7 - dihydroxy-14-methyl-Δ⁹,¹¹⁽¹⁾-decahydrophenanthrene and principally its methyl ester. The oily residue so obtained is then taken up with anhydrous methanol and heated in the presence of a small amount of anhydrous hydrochloric acid. The reaction mass is subjected to vacuum distillation and the oily residue so obtained taken up with chloroform, washed with several portions of a saturated sodium chloride solution and then with water. The chloroform solution is dried over magnesium sulfate and the so dried solution subjected to vacuum distillation. The colorless oily residue is methyl ester of the levo-rotatory isomer of anti-trans - 1 - (β - carboxyethyl) - 2 - keto - 6,7 - dihydroxy-14-methyl-Δ⁹,¹¹⁽¹⁾-decahydrophenanthrene.

In a similar fashion the methyl ester of dl-anti-trans-1-( β- carboxyethyl) - 2 - keto - 6,7 - dihydroxy - 14- methyl-Δ⁹,¹¹⁽¹⁾-decahydrophenanthrene is obtained from the methyl ester of dl-anti-trans-1-(β-carboxyethyl)-2-keto-14-methyl-Δ⁶,⁹,¹¹⁽¹⁾-octahydrophenanthrene.

In the fifth step of the process outlined herein the 6,7-glycol (Compound V) is reacted with a cyclic acetal forming agent in the presence of a dehydrating catalyst. The preferred cyclic acetals (Compound VI) so produced are those obtained from the symmetrical ketones such as acetone, diethyl ketone, cyclohexanone, p-methylcyclohexanone, etc. As illustrative of this step is the following,

Example V 20.8 parts by weight of the methyl ester of the levo-rotatory isomer of anti-trans-1-($\beta$-carboxyethyl)-2-keto-6,7-dihydroxy-14-methyl-$\Delta^{9,11(1)}$-decahydrophenanthrene, 112 parts by weight of anhydrous copper sulfate and 960 parts by weight of dry acetone are intimately mixed at room temperature for about 60 hours. The reaction mass is filtered and the filtrate treated with anhydrous potassium carbonate and filtered and the filtrate subjected to vacuum distillation using a water aspirator. The residue on recrystallization from benzene-petroleum ether yielded white crystalline levo-rotatory isomer of the acetonide of the methyl ester of anti-trans-1-($\beta$-carboxyethyl)-2-keto-6,7 - dihydroxy - 14 - methyl - $\Delta^{9,11(1)}$ - decahydrophenanthrene, M. P. 122–124° C., $[\alpha]_D^{25} = -242.5°$ ($C=2$, $CHCl_3$).

In a similar fashion the acetonide of the methyl ester of $dl$ - anti - trans - 1 - ($\beta$ - carboxyethyl) - 2 - keto - 6,7-dihydroxy - 14 - methyl - $\Delta^{9,11(1)}$ - decahydrophenanthrene is obtained from the methyl ester of $dl$-anti-trans-1-($\beta$-carboxyethyl) - 2 - keto - 6,7 - dihydroxy - 14 - methyl-$\Delta^{9,11(1)}$-decahydrophenanthrene.

In the sixth step of the process outlined herein the 9,10-double bond of the acetonide (Compound VI) is selectively reduced in the presence of palladium. The reduction is preferably carried out in a liquid medium, such as an inert organic solvent incapable of hydrogenation under the conditions of the reaction. Examples of such are benzene, toluene, xylene, ethyl benzene, cyclohexane, the liquid alkanes, the lower aliphatic alcohols, etc. As illustrative of this step is the following:

Example VI

Approximately 20 parts by weight of the levo-rotatory isomer of the acetonide of the methyl ester of anti-trans-1-($\beta$-carboxyethyl)-2-keto-6,7-dihydroxy-14-methyl-$\Delta^{9,11(1)}$-decahydrophenanthrene is admixed in a suitable reaction vessel with approximately 160 parts by weight of isopropanol, approximately 0.3 part by weight of 10% aqueous sodium hydroxide and 4 parts by weight of a 2% palladium-strontium carbonate catalyst (which had been previously reduced). While agitating, gaseous hydrogen is passed into the mixture at about 25° C. at a pressure slightly above atmospheric. After absorption of substantially one molar equivalent (approximately 0.0535 mol) of hydrogen the catalyst is filtered off and the filtrate neutralized with acetic acid and subjected to vacuum distillation to remove the solvent. The residue is taken up with chloroform, washed with aqueous sodium bicarbonate followed by a water wash, dried over magnesium sulfate, and then evaporated to dryness. The white crystalline product so obtained is the levo-rotatory isomer of the acetonide of the methyl ester of anti-trans-1-($\beta$-carboxyethyl)-2-keto-6,7-dihydroxy-14-methyl-$\Delta^{11(1)}$-dodecahydrophenanthrene, M. P. 106–108° C., $[\alpha]_D^{25} = -123°$ ($C=2$, $CHCl_3$).

In a similar fashion the acetonide of the methyl ester of $dl$-anti-trans-1-($\beta$-carboxyethyl)-2-keto-6,7-dihydroxy-14-methyl-$\Delta^{11(1)}$-dodecahydrophenanthrene is obtained by selectively reducing the acetonide of the methyl ester of $dl$-anti-trans-1-($\beta$-carboxyethyl)-2-keto-6,7-dihydroxy-14-methyl-$\Delta^{9,11(1)}$-decahydrophenanthrene employing palladium as the hydrogenation catalyst.

In the seventh step of the process outlined herein the acetonide (Compound VII) is hydrolyzed with an acid to the corresponding cis-glycol (Compound VIII), namely 1-($\beta$-carboxyethyl)-2-keto-6,7-dihydroxy-14-methyl-$\Delta^{11(1)}$-dodecahydrophenanthrene

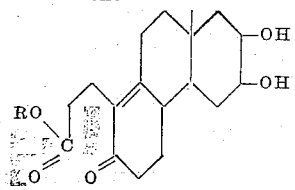

where R is a short chain alkyl group, which glycol is preferably not isolated but oxidized (the eighth step of the process outlined herein) to provide the dialdehyde, namely an alkyl ester of 1-($\beta$-carboxyethyl)-2-keto-5,6-di(formylmethyl) - 6 - methyl - $\Delta^{1(9)}$ - octahydronaphthalene (Compound IX)

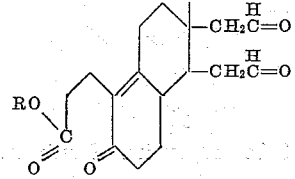

which dialdehyde is dissolved in an aromatic hydrocarbon solvent and cyclized (ninth step of the process outlined herein) in the presence of a carboxylic acid salt of an organic nitrogen base such as piperidine acetate to provide the corresponding alkyl ester of 3-formyl-3a-methyl-6-($\beta$-carboxyethyl)-7-keto-$\Delta^{2,5a(6)}$-octahydropentanthrene

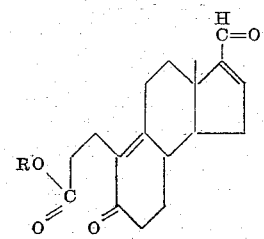

As illustrative of the preparation of the alkyl ester of 3-formyl - 3a - methyl - 6 - ($\beta$ - carboxyethyl) - 7 - keto-$\Delta^{2,5a(6)}$-octahydropentanthrene (Compound X) from the cyclic acetal the alkyl ester of 1-($\beta$-carboxyethyl)-2-keto-6,7-dihydroxy-14-methyl-$\Delta^{11(1)}$-dodecahydrophenanthrene is the following:

Example VII 9 parts by weight of the levo-rotatory isomer of the acetonide of the methyl ester of anti-trans-1-($\beta$-carboxyethyl) - 2 - keto - 6,7 - dihydroxy - 14 - methyl - $\Delta^{11(1)}$-dodecahydrophenanthrene is dissolved in approximately 60 parts by weight of acetic acid. Thereupon 60 parts by weight of water is added, intimately mixed and the solution heated on a steam bath for one hour. The solution is cooled to 0–5° C. and approximately 210 parts by weight of water is added. To the solution of the cis-glycol so prepared is added at about 0–5° C. 11.25 parts by weight of lead tetraacetate and 210 parts by weight of acetic acid. The slurry so obtained is agitated for about 10 minutes, and thereafter is added with agitation approximately 100 parts by weight of water. The mixture is then extracted with two 375 parts by weight portions of chloroform. The extracts are combined and washed successively with dilute aqueous sodium bicarbonate, 200 parts by weight of 1 N sulfuric acid, dilute aqueous sodium bicarbonate, and finally with water. The so washed solution is dried over magnesium sulfate, filtered and the filtrate subjected to vacuum distillation. The oily residue is the dialdehyde, which is taken up with approximately 1350 parts by weight of anhydrous benzene and heated to 80° C. Thereto is added with agitation approximately 3 parts by weight of acetic acid and approximately 2 parts by weight of piperidine. The mix so obtained is heated at 70–80° C. for about one hour while passing nitrogen over the mixture and slowly distilling the water-benzene azeotrope. The reaction mixture is cooled to room temperature and washed successively with dilute hydrochloric acid, dilute sodium bicarbonate and finally with water. The solution is dried over anhydrous magnesium sulfate and the so dried solution subjected to vacuum distillation. Upon recrystallization of the residue so obtained from diethyl ether, the dextro-rotatory methyl ester of anti-trans - 3 - formyl - 3a - methyl - 6 - ($\beta$ - carboxyethyl) - 7- keto-Δ$^{2,5a(6)}$-octahydropentanthrene, M. P. 70–72° C., is obtained.

Similarly the methyl ester of dl-anti-trans-3-formyl-3a-methyl - 6 - (β - carboxyethyl) - 7 - keto - Δ$^{2,5a(6)}$ - octahydropentanthrene is obtained by the acid hydrolysis of the acetonide of the methyl ester of dl-anti-trans-1-(β-carboxyethyl) - 2 - keto - 6,7 - dihydroxy - 14 - methyl - Δ$^{11(1)}$-dodecahydrophenanthrene, cleavage of the glycol so obtained followed by ring closure of the dialdehyde so produced.

In the tenth step of the process outlined herein the 2,3-double bond of the alkyl ester of 3-formyl-3a-methyl-6 - (β - carboxyethyl) - 7 - keto - Δ$^{2,5a(6)}$ - octahydropentanthrene (Compound X) is selectively reduced in the presence of palladium to provide the alkyl ester of 3-formyl - 3a - methyl - 6 - (β - carboxyethyl) - 7 - keto - Δ$^{5a(6)}$-decahydropentanthrene (Compound XI)

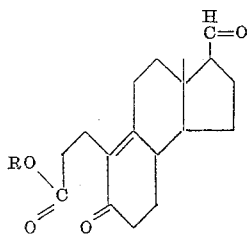

The reduction is preferably carried out in a liquid medium, such as for example in the presence of an inert organic solvent incapable of hydrogenation under the conditions of the reaction. As illustrative of this step is the following

*Example VIII*

Approximately 35.8 parts by weight of the dextro-rotatory methyl ester of anti-trans-3-formyl-3a-methyl-6-(β - carboxyethyl) - 7 - keto - Δ$^{2,5a(6)}$ - octahydropentanthrene is admixed in a suitable reaction vessel with approximately 800 parts by weight of isopropanol and approximately 15 parts by weight of a 2% palladium-strontium carbonate (which had been previously reduced). While agitating, gaseous hydrogen is passed into the mixture at about 25° C. at a pressure slightly above atmospheric. After absorption of substantially one molar equivalent (approximately 0.114 mole) of hydrogen, the catalyst is filtered off and the filtrate subjected to vacuum distillation. The oily residue is the dextro-rotatory methyl ester of anti-trans-3-formyl-3a-methyl-6-(β-carboxyethyl)-7-keto-Δ$^{5a(6)}$-decahydropentanthrene.

In a similar fashion the methyl ester of dl-anti-trans-3 - formyl - 3a - methyl - 6 - (β - carboxyethyl) - 7 - keto-Δ$^{5a(6)}$-decahydropentanthrene is obtained from the methyl ester of dl-anti-trans-3-formyl-3a-methyl-6-(β-carboxyethyl)-7-keto-Δ$^{2,5a(6)}$-octahydropentanthrene employing palladium as the reduction catalyst.

In the eleventh step of the process outlined herein the mono-ethylene ketal, namely an alkyl ester of 3-[2-(1,3-dioxacyclopentanyl)] - 3a - methyl - 6 - (β - carboxyethyl)-7-keto-Δ$^{5a(6)}$-decahydropentanthrene (Compound XII) is prepared by condensing an alkyl ester of 3-formyl-3a - methyl - 6 - (β - carboxyethyl) - 7 - keto - Δ$^{5a(6)}$ - decahydropentanthrene with an equimolecular amount of ethylene glycol in the presence of an acid condensation catalyst. As illustrative of this process step is the following

*Example IX*

Approximately 35 parts by weight of the dextro-rotatory isomer of the methyl ester of anti-trans-3-formyl-3a-methyl - 6 - (β - carboxyethyl) - 7 - keto - Δ$^{5a(6)}$ - decahydropentanthrene of Example VIII is dissolved in mixture of about 2500 parts by weight of dioxan and 4500 parts by weight of benzene. Thereto is added and intimately mixed above 7.8 parts by weight of ethylene glycol and approximately 1 part by weight of p-toluene sulfonic acid. The reaction mass is brought to reflux and the benzene-water azeotrope slowly distilled off. Thereafter the mass is subjected to vacuum distillation to remove the solvent. The residue is taken up with chloroform, and the chloroform solution washed with aqueous potassium carbonate followed by a water wash. The chloroform solution is dried and subjected to vacuum distillation. The residue on recrystallization from diethyl ether gives white crystals of the optically active isomer of the mono-ethylene ketal of the methyl ester anti-trans-3 - formyl - 3a - methyl - 6 - (β - carboxyethyl) - 7 - keto-Δ$^{5a(6)}$-decahydropentanthrene, M. P. 99–101° C.

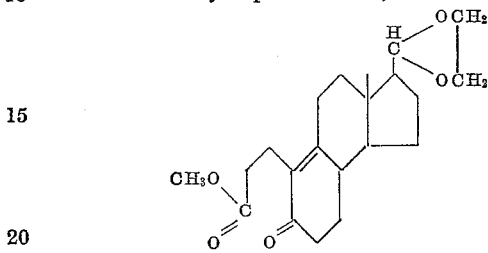

In a similar fashion the methyl ester of dl-anti-trans-3 - [2 - (1,3 - dioxacyclopentanyl)] - 3a - methyl - 6 - (β-carboxyethyl)-7-keto-Δ$^{5a(6)}$-decahydropentanthrene is obtained upon condensing ethylene glycol with the methyl ester of dl-anti-trans-3-formyl-3a-methyl-6-(β-carboxyethyl)-7-keto-Δ$^{5a(6)}$-decahydropentanthrene in the presence of an acid condensation catalyst.

In the twelfth step of the process outlined herein an angular methyl group is introduced to the 6-position of the pentanthrene nucleus by reacting methyl iodide (or like methylating agents such as dimethyl sulfate, methyl tosylate, etc., with the alkyl ester of 3-[2-(1,3-dioxacyclopentanyl)] - 3a - methyl - 6 - (β - carboxyethyl) - 7 - keto-Δ$^{5a(6)}$-decahydropentanthrene (Compound XII). In the introduction of the angular methyl group a new asymmetric center is introduced and thus a mixture of stereoisomers results. This mixture is preferably not isolated and separated into its isomeric parts, but converted directly by hydrolysis (step thirteen of the process outlined herein) to the corresponding carboxy ethyl derivative (Compound XIV). The carboxy ethyl derivative so obtained is a mixture of isomeric anti-trans-3-[2-(1,3-dioxacyclopentanyl)] - 3a - 6 - dimethyl - 6 - (β - carboxy -ethyl)-7-keto-Δ$^5$-decahydropentanthrene, which isomers for purposes of this invention may be represented structurally and defined as follows

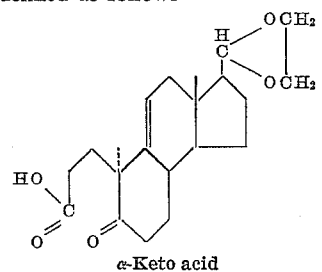

α-Keto acid

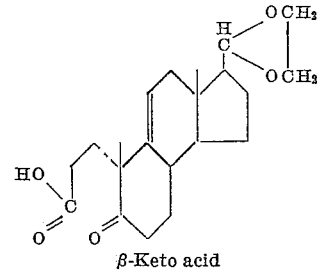

β-Keto acid

Although both of the isomeric α- and β-keto acids may be converted to a tetracyclic ketone of the general structure of Compounds XV, XVI and XVII of the diagram set forth hereinbefore the β-keto acid as identified herein produces a tetracyclic ketone of the perhydrocyclopentanophenanthrene series whose angular methyl groups are on the same side of the cyclopentanophenanthrene reference plane while the α-keto acid provides a tetracyclic ketone whose angular methyl groups are on opposite sides.

As illustrative of the introduction of the angular methyl group in the 6-position of the pentanthrene nucleus of an alkyl ester of 3-[2-(1,3-dioxacyclopentanyl)]-3a-methyl-6 - (β - carboxyethyl) - 7 - keto - $\Delta^{5a(6)}$ - decahydropentanthrene to provide an alkyl ester of 3-[2-(1,3-dioxacyclopentanyl)] - 3a,6 - dimethyl - 6 - (β - carboxyethyl) - 7 - keto-$\Delta^5$-decahydropentanthrene (Compound XIII) and conversion to the free acid (Compound XIV) is the following:

Example X 12.22 parts by weight of the mono-ethylene ketal of the optically active methyl ester of anti-trans-3-formyl-3a-methyl - 6 - (β - carboxyethyl) - 7 - keto - $\Delta^{5a(6)}$ - decahydropentanthrene of Example IX is dissolved in a mixture of about 360 parts by weight of benzene and about 320 parts by weight of tert. butanol. Thereto is added and intimately mixed 285 parts by weight of 0.467 N potassium tert. butoxide in tert. butanol. While refluxing the mixture approximately 41 parts by weight of methyl iodide is cautiously added. Upon completion of the methyl iodide addition the reaction mass is refluxed for about 5 minutes. The mix is cooled to room temperature. This solution which contains the respective methyl esters of the α- and β-anti-trans-keto acids in a weight ratio of approximately 1 to 2 is admixed with 200 parts by weight of water in order to hydrolyze the esters. The organic layer is separated and extracted with dilute aqueous potassium hydroxide. The organic layer is separated and cooled to about 0–5° C., admixed with an equal volume of diethyl ether and the mix then acidified with dilute sulfuric acid. The aqueous layer is removed and extracted with two equal volumes of diethyl ether. The ether extracts are combined, washed with water and dried. Upon removal of the ether by vacuum distillation approximately 11.96 parts by weight of an oil consisting of the α and β isomers of the respective keto-acids in weight ratio of approximately 1 to 2 is obtained.

If desired the oily mixture of α- and β-keto acids may be separated into its component parts by various well known methods. As for example by dissolving the oil in a low molecular weight alkanol such as methanol, admixing therewith a chemically equivalent weight of quinine, and refluxing the reaction mass. Upon cooling to room temperature or below the respective quinine salts may be effectively separated by fractional crystallization. The respective quinine salts on treatment with an alkaline material more basic than quinine in an aqueous medium, followed by separating the free quinine by filtration, and subsequently acidifying with mineral acid yields the respective α- and β-keto acids in separated form. In general, however, the mixture is not separated into its component keto-acid isomeric parts but boiled (step fourteen of the process outlined herein) with acetic anhydride in the presence of a small amount of sodium acetate. By so doing the enol lactone (Compound XV), e. g. 3-keto-17-[2-(1,3-dioxacyclopentanyl)]-cyclopentano - 10,13 - dimethyl - $\Delta^{5,9(11)}$ - 4 - oxadecahydrophenanthrene, is obtained as a mixture of isomers which may be represented structurally and defined as follows:

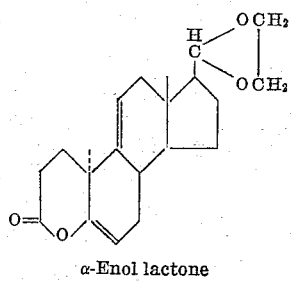

α-Enol lactone

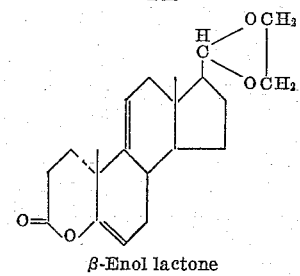

β-Enol lactone

As illustrative of this step is the following:

Example XI 11.96 parts by weight of the oily mixture of keto-acids obtained in Example X is dissolved in 162 parts by weight of acetic anhydride containing 0.1 part by weight of sodium acetate and refluxed for four hours under an atmosphere of nitrogen. The reaction mass is then cooled. The acetic anhydride is removed by vacuum distillation and the residue taken up with diethyl ether. The solution is washed with aqueous sodium bicarbonate, followed by a water wash and dried. Upon removal of the ether by vacuum distillation an oil is obtained which on standing crystallized. The weight yield is 9.95 parts by weight of a mixture of α- and β-enol lactones in about a 1 to 2 weight ratio.

In the fifteenth step of the process outlined herein the enol lactone (Compound XV) is converted to the corresponding tetracyclic ketone (Compound XVI), i. e. the mono-ethylene ketal of 3-keto-17-formyl-cyclopentano-10,13-dimethyl-$\Delta^{4,9(11)}$-decahydrophenanthrene, by reacting the former with a methyl magnesium halide in diethyl ether, decomposing the addition product with mineral acid, and then treating the ether solubles with an alcohol solution of an alkali metal hydroxide. This step affords the means for conveniently separating the unwanted stereoisomer from the desired stereoisomer and as illustrative thereof is the following:

Example XII 9.95 parts by weight of the crystalline mixture of α- and β-enol lactones of Example XI is dissolved in mixture of about 500 parts by weight diethyl ether and about 175 parts by weight of benzene and cooled to about —50° C. Thereto is added with agitation an ether solution containing 4.25 parts by weight of methyl magnesium bromide while maintaining the temperature below —50° C. Upon completion of the methyl magnesium bromide addition the mix is stirred at —50 to —55° C. for about 90 minutes. Thereafter approximately 50 parts by weight of acetone, approximately 60 parts by weight of water and approximately 20 parts by weight of acetic acid is added and intimately mixed and the mix permitted to rise to about 0° C. The layers are separated and the ether extract washed with aqueous sodium carbonate, water washed, dried and subjected to vacuum distillation. The oily residue is taken up with 400 parts by weight of methyl alcohol and thereto is added 72 parts by weight of 16.7% aqueous solution of potassium hydroxide and the mixture so obtained refluxed for about 2 hours under a nitrogen atmosphere. Thereupon substantially all of the methanol is removed by vacuum distillation. An equal volume of water is added to the residue, and the resultant mix extracted twice with equal volumes of chloroform. The extracts are combined, dried and subjected to vacuum distillation. Approximately 6.51 parts by weight of an oily residue which partially crystallized on standing is obtained. The residue is dissolved in methanol and set aside to permit crystallization. Upon filtration white crystals of the optically active mono-ethylene ketal of $\Delta^{9(11)}$-21-norprogesterone, M. P. 172–175° C. $[\alpha]_D^{25}$= +70.6 (C=2, CHCl$_3$), is obtained.

In a similar manner the mono-ethylene ketal of white crystalline dl-Δ⁹⁽¹¹⁾-21-norprogesterone is obtained by proceeding through the processes set forth in Examples X and XI beginning with the alkyl ester of dl-anti-trans-3 - [2 - (1,3 - dioxacyclopentanyl)] - 3a - methyl - 6 - (β-carboxyethyl)-7-keto-Δ⁵ᵃ⁽⁶⁾-decahydropentanthrene.

In the sixteenth step of the process outlined herein the mono-ethylene ketal (Compound XVI) is converted to the corresponding 17-formyl-cyclopentano-10,13-dimethyl-Δ⁴,⁹⁽¹¹⁾-decahydrophenanthrene-3-one (Compound XVII) by heating the former in the presence of an acid. As illustrative of such is the following:

*Example XIII*

5 parts by weight of the mono-ethylene ketal obtained by the process of Example XI is heated with 5000 parts by weight of 50% aqueous acetic acid at 100° C. for approximately 90 minutes. The reaction mass is subjected to vacuum distillation and the residue taken up with chloroform. The chloroform solution is washed with aqueous sodium bicarbonate and finally with water and dried. The oil residue on crystallization gives white crystalline dextro-rotatory isomer of Δ⁹⁽¹¹⁾-21-norprogesterone, M. P. 127–131° C.

Similarly dl-Δ⁹⁽¹¹⁾-21-norprogesterone is obtained from the mono-ethylene ketal of dl-Δ⁹⁽¹¹⁾-21-norprogesterone.

The compound of Example XII so obtained is identical with that obtained by reacting one molar equivalent of hydrogen with the dextro-rotatory isomer of Δ⁹⁽¹¹⁾,¹⁶-21-norprogesterone (M. P. 160.5–161.5° C.) in the presence of palladium and is described and claimed in co-pending application Serial No. 426,311, filed April 28, 1954, of Harold Raffelson. This optically active isomer upon re-acting with methyl magnesium bromide, hydrolyzing the complex so obtained, followed by oxidation with chromic acid in the presence of pyridine provides for the dextro-rotatory isomer of Δ⁹⁽¹¹⁾-progesterone.

While this invention has been described with respect to certain embodiments it is to be understood that it is not so limited and that variations and modifications thereof obvious to those skilled in the art may be made without departing from the spirit or scope of the invention.

Compounds of the structural formula of that of Compound II of the foregoing diagram are claimed in co-pending application Serial No. 436,721, filed of even date, of Martin W. Farrar.

Compounds of the structural formulae of that of Compounds III and IV of the foregoing diagram are claimed in co-pending application Serial No. 436,718, filed of even date, of Quentin E. Thompson and Harold Raffelson.

Compounds of the structural formulae of that of Compounds V and VI of the foregoing diagram are claimed in co-pending application Serial No. 436,723, filed of even date, of William S. Knowles.

Compounds of the structural formulae of that of Compounds VIII, IX, X, XI, XII, XIII, XIV, XV and XVI of the foregoing diagram are claimed in co-pending application Serial No. 436,722, filed of even date of Lloyd B. Barkley.

What is claimed is:

1. The cyclic acetal of the alkyl ester of 1-(β-carboxyethyl) - 2 - keto-6,7 - dihydroxy - 14 - methyl - Δ¹¹⁽¹⁾-dodecahydrophenanthrene of the structure

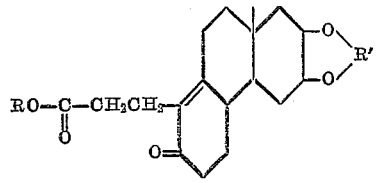

where R is a short chain alkyl radical and where R' is the hydrocarbon residue of a simple symmetrical mono-ketone selected from the group consisting of acetone, diethyl ketone, cyclohexanone and para-methyl-cyclohexanone upon removal of the oxygen atom.

2. The anti-trans isomers of the compound of claim 1.

3. The acetonide of the methyl ester of 1-(β-carboxyethyl) - 2 - keto - 6,7 - dihydroxy - 14-methyl - Δ¹¹⁽¹⁾-dodecahydrophenanthrene.

4. The anti-trans isomers of the compound of claim 3.

5. The acetonide of the methyl ester of the levo-rotatory isomer of anti-trans-1-(β-carboxyethyl)-2-keto-6,7-dihydroxy-14-methyl-Δ¹¹⁽¹⁾-dodecahydrophenanthrene.

6. The process of making the compound of claim 1 which comprises reacting the cyclic acetal of the alkyl ester of 1-(β-carboxyethyl)-2 - keto - 6,7 - dihydroxy - 14-methyl-Δ⁹,¹¹⁽¹⁾-decahydrophenanthrene with one molar equivalent of hydrogen in the presence of palladium, the said cyclic acetal reactant being of the structure

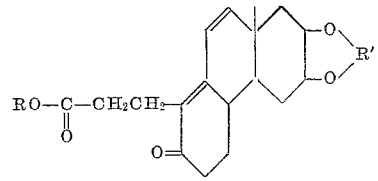

wherein R is a short chain alkyl radical and where R' is the hydrocarbon residue of a simple symmetrical mono-ketone selected from the group consisting of acetone, diethyl ketone, cyclohexanone and para-methyl-cyclohexanone upon removal of the oxygen atom.

7. The process of claim 6 conducted in the presence of an inert organic solvent and wherein palladium is dispersed in strontium carbonate.

8. The process of claim 6 conducted in the presence of a low molecular weight aliphatic alcohol and wherein palladium is dispersed in strontium carbonate.

9. The process of making the compound of claim 3 which comprises reacting the acetonide of the methyl ester of 1 - (β - carboxyethyl) - 2 - keto - 6,7 - dihydroxy - 14 - methyl-Δ⁹,¹¹⁽¹⁾-decahydrophenanthrene with one molar equivalent of hydrogen in the presence of palladium.

10. The process of claim 9 conducted in the presence of an inert organic solvent and wherein the palladium is dispersed in strontium carbonate.

11. The process of claim 9 conducted in the presence of a low molecular weight aliphatic alcohol and wherein the palladium is dispersed in strontium carbonate.

References Cited in the file of this patent

UNITED STATES PATENTS

| | | |
|---|---|---|
| 2,672,482 | Woodward | Mar. 16, 1954 |
| 2,681,366 | Woodward | June 15, 1954 |

OTHER REFERENCES

Woodward et al.: JACS, vol. 73, p. 2404 (1951).
Woodward et al.: JACS, vol. 74, pp. 4223–51 (1952).

UNITED STATES PATENT OFFICE
CERTIFICATE OF CORRECTION

Patent No. 2,846,445                                    August 5, 1958

Harold Raffelson

It is hereby certified that error appears in the printed specification of the above numbered patent requiring correction and that the said Letters Patent should read as corrected below.

Column 13, line 27, for "Example XII" read -- Example XIII --; column 14, line 44, for "onducted" read -- conducted --.

Signed and sealed this 12th day of April 1960.

(SEAL)
Attest:

KARL H. AXLINE
Attesting Officer

ROBERT C. WATSON
Commissioner of Patents